United States Patent
Laffey

(10) Patent No.: US 8,591,140 B2
(45) Date of Patent: Nov. 26, 2013

(54) PATCHING MATERIAL USING POWDER COATING PAINT AND METHOD OF USING

(76) Inventor: Duane J. Laffey, Maxwell, IA (US)

( * ) Notice: Subject to any disclaimer, the term of this patent is extended or adjusted under 35 U.S.C. 154(b) by 0 days.

(21) Appl. No.: 13/117,732

(22) Filed: May 27, 2011

(65) Prior Publication Data
US 2012/0301222 A1 Nov. 29, 2012

(51) Int. Cl.
*E01C 23/14* (2006.01)

(52) U.S. Cl.
USPC .............. 404/77; 404/78; 404/79; 404/107; 521/40

(58) Field of Classification Search
USPC ........... 404/17, 20, 21, 27, 31, 32, 72, 75, 77, 404/79, 90, 92, 95, 101, 102, 107, 108; 521/40–41; 428/522
See application file for complete search history.

(56) References Cited

U.S. PATENT DOCUMENTS

| | | | |
|---|---|---|---|
| 4,116,705 A * | 9/1978 | Chappell | 588/257 |
| 4,252,459 A * | 2/1981 | Jeppson | 404/77 |
| 4,630,963 A * | 12/1986 | Wyman | 404/75 |
| 4,980,030 A * | 12/1990 | Johnson et al. | 203/4 |
| 5,496,404 A * | 3/1996 | Price et al. | 106/407 |
| 5,573,587 A | 11/1996 | St. Louis | |
| 5,922,834 A | 7/1999 | Gerace et al. | |
| 6,362,257 B1 | 3/2002 | Chehovits et al. | |
| 6,588,973 B1 * | 7/2003 | Omann | 404/17 |
| 6,984,670 B2 * | 1/2006 | Meyers et al. | 521/40 |
| 7,128,780 B2 | 10/2006 | Matheson et al. | |
| 8,029,868 B1 * | 10/2011 | Gerace | 427/403 |
| 2003/0213412 A1 | 11/2003 | Drew | |
| 2008/0314290 A9 | 12/2008 | Williams | |
| 2009/0275687 A1 * | 11/2009 | Chrzanowski et al. | 524/425 |
| 2011/0081553 A1 * | 4/2011 | Mehlmann et al. | 428/522 |

OTHER PUBLICATIONS

CRAFCO, Asphalt Repair Products—PolyPatch & Mastic One, Jul. 2010, Chandler, Arizona.

* cited by examiner

*Primary Examiner* — Raymond W Addie
(74) *Attorney, Agent, or Firm* — Ryan N. Carter; Glenn Johnson

(57) ABSTRACT

A product and method for repairing holes and cracks in roads, parking lots, sidewalks and other similar surfaces using a mixture of powder coating (i.e. dry paint) and a filler. The first step is to obtain the powder coating material. Any suitable powder coating material may be used, however, it is preferable to use the excess or waste powder coating material obtained from a powder coating operation. The next step is to mix the powder coating material with a filler, such as sand, pea gravel, or another suitable material. After the components are mixed together, it is applied to a surface needing repair such as a pothole in a road or a crack in a sidewalk. The mixture is cured by heating the mixture to the point where the powder coating melts and binds the powder coating with the filler and the surface needing repair. It may be cured before or after it is applied to the surface needing repair. After the mixture cures, the result is a high quality patched surface.

25 Claims, 1 Drawing Sheet

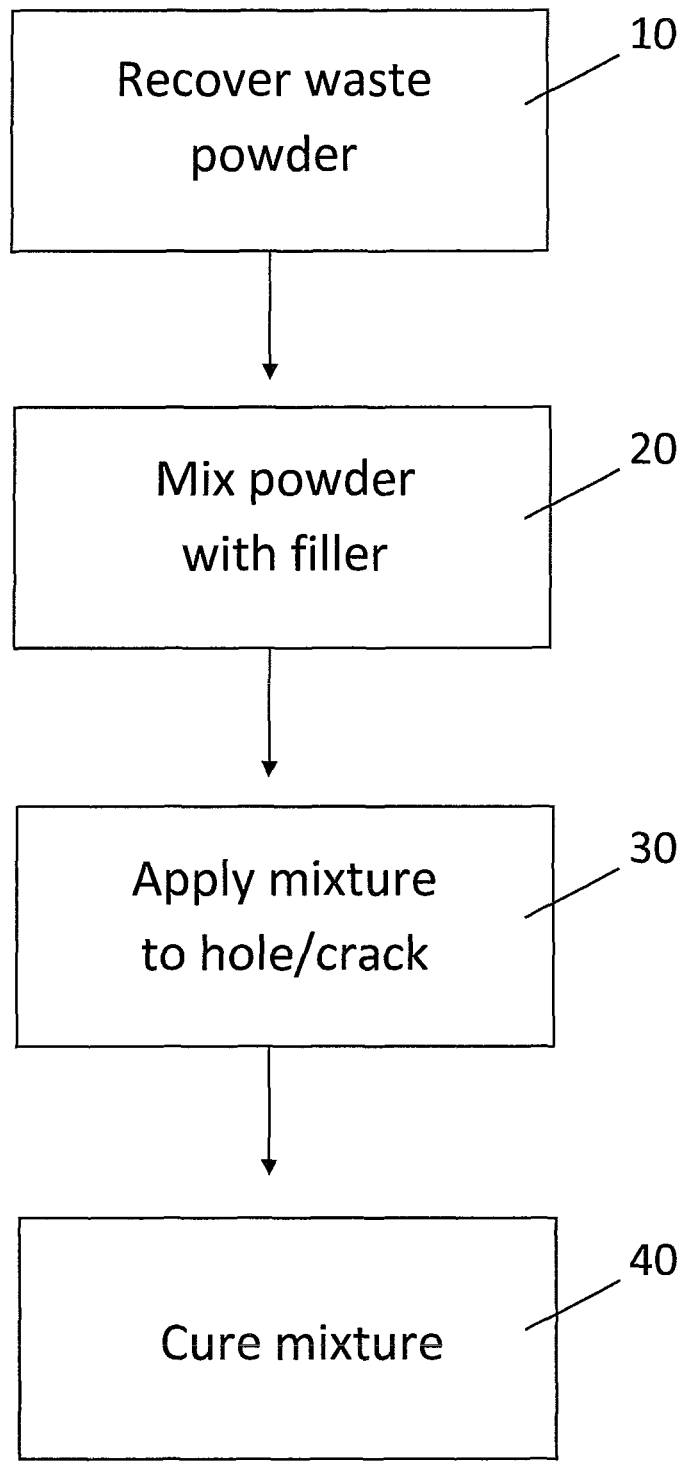

PATCHING MATERIAL USING POWDER COATING PAINT AND METHOD OF USING

BACKGROUND

In a powder coating paint operation, charged particles of solid paint are deposited on an oppositely charged surface and the surface is heated to fuse the paint to the surface. This operation is well known and provides a high quality paint finish to a product without the use of volatile solvents.

While the finish on a powder coated product is desirable, the painting operation used in the application of powder coating paints has some drawbacks. The paint particles not deposited and retained on the product are difficult to control and recover, with the particles tending to settle on and coat the objects and floor of the paint booth. While some of this paint can be recovered and reused, much of it is sent to a landfill. This results in a substantial amount of paint loss with powder coating paint operations.

It is therefore desirable to develop new methods of recycling power coating paint.

SUMMARY

The present invention relates to a product and method for repairing holes and cracks in roads, parking lots, sidewalks and other similar surfaces such as asphalt, cement, or masonry surfaces using a mixture of powder coating (i.e. dry paint) and a filler. The first step is to obtain the powder coating material. Any suitable powder coating material may be used, however, it is preferable to use the excess or waste powder coating material obtained from a powder coating operation. The next step is to mix the powder coating material with a filler, such as sand, pea gravel, or another suitable material. After the components are mixed together, it is applied to a surface needing repair such as a pothole in a road or a crack in a sidewalk. The mixture is cured by heating the mixture to the point where the powder coating melts and binds the powder coating with the filler and the surface needing repair. It may be cured before or after it is applied to the surface needing repair. After the mixture cures, the result is a high quality patched surface.

BRIEF DESCRIPTION OF THE DRAWINGS

FIG. 1 is a flow chart showing the main steps in the process.

DETAILED DESCRIPTION

The present invention relates to a product and method for repairing holes and cracks in roads, parking lots, sidewalks and other similar surfaces such as asphalt, cement, or masonry surfaces using a mixture of powder coating (i.e. dry paint) and a filler. The three main types of powder coatings are polyester, hybrid polyester, and epoxy, however, any suitable powder coating material may be used. Typically, powder coatings consists of four or five components, including, resin, crosslinker (not used in all powders), pigments and extenders, flow aids, and a degassing material (solid).

FIG. 1 shows the four main steps in the process. As shown by reference number 10, the first step is to obtain the powder coating material. The powder coating material may be new material or it may be recycled material. In one embodiment, the powder coating material is the excess or waste powder coating material obtained from a powder coating operation. The powder coating material can be gathered from the powder coating operation facility by sweeping or vacuuming it up off the floor of the powder coating operation room, collecting it in filters used in the powder coating operation, or any other suitable collection method. In some embodiments, the powder coating that is collected can be separated by color thereby allowing the end product to color matched with a road, garage, factory floor, etc. . . . Many powder coating operations already collect waste powder coating material and send it to a landfill, thus, it may be possible to obtain powder coating material from operations that have already collected and contained waste powder coating material.

A next step is represented by reference number 20 in FIG. 1. In this step, powder coating material is mixed with a filler material, such as sand, pea gravel, glass beads, ground asphalt, powdered rock, or powdered cement. (As an alternative to functioning as a filler, the glass beads may also be used to give the material a reflective characteristic). The filler material provides strength to the powder coating which would otherwise be too brittle for its purpose described herein. The filler material may be mixed with the powder coating material by hand or mixed using a mechanical mixer such as a cement mixer. In some embodiments, the diameter of the filler material particles is between 62 micrometers and 2000 micrometers, which is roughly the size of a particle of sand. The filler material should be dry or semi-dry before it is mixed with the powder coating material. In some embodiments, the filler material should have a moisture content of less than 50% to achieve best results. It may be necessary to dry the filler material prior to mixing it with the power coating. The powder coating and filler are typically mixed together in a ratio of about 50:50 by volume. However, other ratios may be used to generate different properties. For example, powder to sand ratios of 70:30, 60:40, 40:60, or any fractions thereof may be used. If the concentration of powder is too high, the finished product can become rigid and brittle which can result in cracking or fracturing of the finished product. On the other hand, if the concentration of sand is too high, the finished product can be too dry which can result in the finished product flaking.

With reference to box 30 in FIG. 1, the next step is to apply the mixture to a surface needing repair such as a pothole in a road or a crack in a sidewalk, floor, or wall. The mixture may be applied to the surface using any suitable means including shoveling the mixture by hand, pouring the mixture from a container, or using a pump.

Box 40 shows another step wherein the mixture is cured by heating the mixture to a temperature where the powder coating melts thereby binding the powder coating with the filler and the surface needing repair. The mixture may be cured before or after it is applied to the surface needing repair. The dry mixture can be stored at room temperature for extended periods of time and only needs to be heated once it is being applied to the surface needing repair. The curing temperature may vary depending on the ratio of powder to sand; however, the powder typically begins melting at about 250 degrees Fahrenheit. To obtain a full cure, it is desirable to heat the mixture to between 300-500 degrees Fahrenheit.

The heat can be applied to the mixture by any suitable means. In one embodiment, the heat is generated and applied to the mixture using an open flame, such as a propane torch. In other embodiments, the mixture can be applied using mechanism that simultaneously sprays the mixture and expels a flame so that the flame melts the mixture after it is sprayed from the mechanism but before it reaches its target. In other embodiments infrared, ultraviolet, or electric heat may be used to cure the mixture. It should be noted that a special type of powder coating known to one of ordinary skill in the art may be required to cure the mixture using ultraviolet radiation.

It is important that all of the powder coating material in the mixture is cured in order to help ensure the patch is strong and durable. Since heat is applied from the top of any hole or crack, it is important to make sure the mixture at the bottom of the hole is properly heated and cured. This can be especially problematic in deep holes or cracks. If the user is applying the mixture in a hole or crack that is more than about three or four inches deep, it is preferable to apply and cure the mixture in layers wherein the user applies and cures three to four inches of mixture at a time in successive steps. This will help ensure that the entire mixture is cured from the top all the way to the bottom of the hole or crack. After the mixture cures, the result is a high quality patched surface.

One benefit of the resultant material is that it is waterproof. This characteristic helps to prevent rain water and melted ice from seeping back into the pothole and destroying the bond between the material and the road.

Having thus described the invention in connection with the preferred embodiments thereof, it will be evident to those skilled in the art that various revisions can be made to the preferred embodiments described herein with out departing from the spirit and scope of the invention. It is my intention, however, that all such revisions and modifications that are evident to those skilled in the art will be included with in the scope of the following claims.

What is claimed is as follows:

1. A patching composition comprising:
   a powder coating having a resin and a crosslinker; and
   a filler;
   wherein the filler has particles that are between about 62 micrometers and 2000 micrometers in diameter;
   wherein the filler is selected from the group consisting of sand, pea gravel, glass beads, fiberglass, ground asphalt, powdered rock, and powdered cement;
   wherein the volume ratio of powder coating to filler is about 50:50.

2. The patching composition of claim 1 wherein the volume ratio of powder coating to filler is about 70:30.

3. The patching composition of claim 1 wherein the volume ratio of powder coating to filler is about 60:40.

4. The patching composition of claim 1 wherein the volume ratio of powder coating to filler is about 40:60.

5. A patching composition comprising:
   a powder coating having a resin and a crosslinker; and
   a filler;
   wherein the filler is selected from the group consisting of sand, pea gravel, glass beads, fiberglass, ground asphalt, powdered rock, and powdered cement.

6. A patching composition comprising:
   a powder coating having a resin and a crosslinker; and
   a filler;
   wherein the filler has particles that are between about 62 micrometers and 2000 micrometers in diameter.

7. A method of patching a surface comprising:
   applying a dry mixture of powder coating material and filler to a surface needing repair, wherein the power coating material includes a resin and a crosslinker; and
   curing the mixture by heating it to a temperature where the powder coating in the mixture melts and binds the powder coating with the filler and the surface needing repair;
   wherein the filler has particles that are between about 62 micrometers and 2000 micrometers in diameter.

8. The method of claim 7 wherein the filler has a moisture content of less than about 50% prior to being mixed with the powder coating material.

9. The method of claim 7 further comprising the step of drying the filler prior to mixing it with the powder coating material so that the filler has a moisture content of less than about 50%.

10. The method of claim 7 wherein the surface needing repair is a pothole in a road.

11. The method of claim 7 wherein a first amount of mixture is applied to the surface needing repair and fully cured before applying a second amount of mixture to the surface and fully curing it.

12. The method of claim 11 wherein the first amount of mixture is about 3-4 inches thick.

13. The method of claim 7 wherein the surface needing repair is a crack in a road.

14. The method of claim 7 wherein the surface needing repair is a crack in a sidewalk.

15. The method of claim 7 wherein the curing temperature is at least about 250 degrees Fahrenheit.

16. The method of claim 7 wherein ultra violet radiation is used to cure the mixture.

17. The method of claim 7 wherein an open flame us used to cure the mixture.

18. The method of claim 7 wherein the mixture is heated before it is applied to the surface needing repair.

19. The method of claim 7 wherein the volume ratio of powder coating to filler is about 50:50.

20. The method of claim 7 wherein the volume ratio of powder coating to filler is about 70:30.

21. The method of claim 7 wherein the volume ratio of powder coating to filler is about 60:40.

22. The method of claim 7 wherein the volume ratio of powder coating to filler is about 40:60.

23. The method of claim 7 wherein the filler is selected from the group consisting of sand, pea gravel, glass beads, fiberglass, ground asphalt, powdered rock, and powdered cement.

24. The method of claim 7 wherein the power coating material is recycled powder coating paint.

25. A method of patching a surface comprising:
    obtaining a powder coating material;
    mixing the powder coating material with a filler to create a dry mixture;
    applying the mixture to a surface needing repair;
    curing the mixture by heating it to a temperature where the powder coating in the mixture melts and binds the powder coating with the filler and the surface needing repair;
    wherein the mixture is applied using mechanism that simultaneously sprays the mixture and expels heat to melt the mixture after it is sprayed from the mechanism but before it reaches its target.

* * * * *